May 19, 1970   R. L. SWANKE ETAL   3,512,500
APPARATUS FOR ENCAPSULATING ELECTRIC COIL STRUCTURES
Filed June 30, 1966   4 Sheets-Sheet 1

INVENTORS
ROY L. SWANKE
LOWELL J. TIMMERSMAN

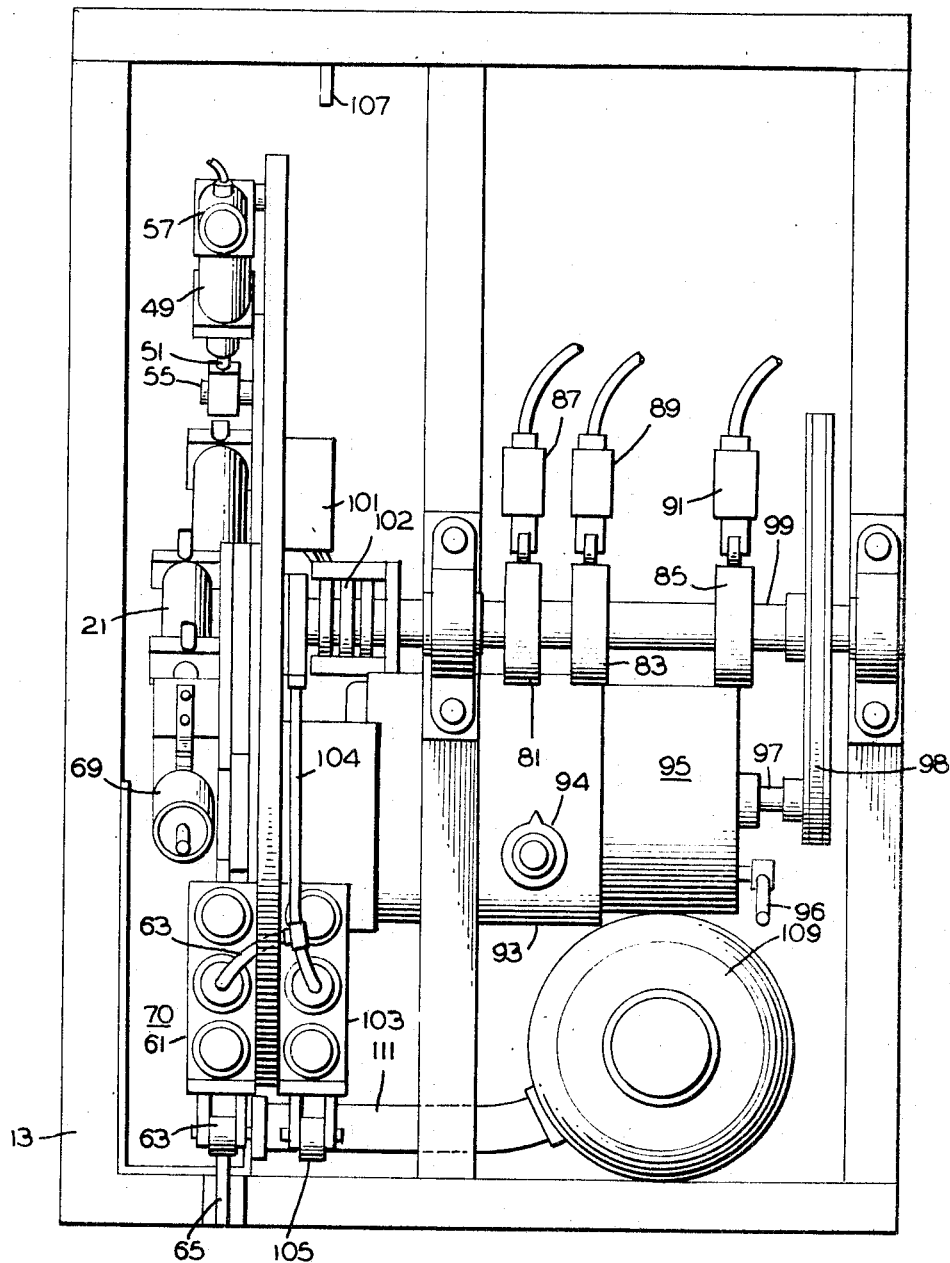

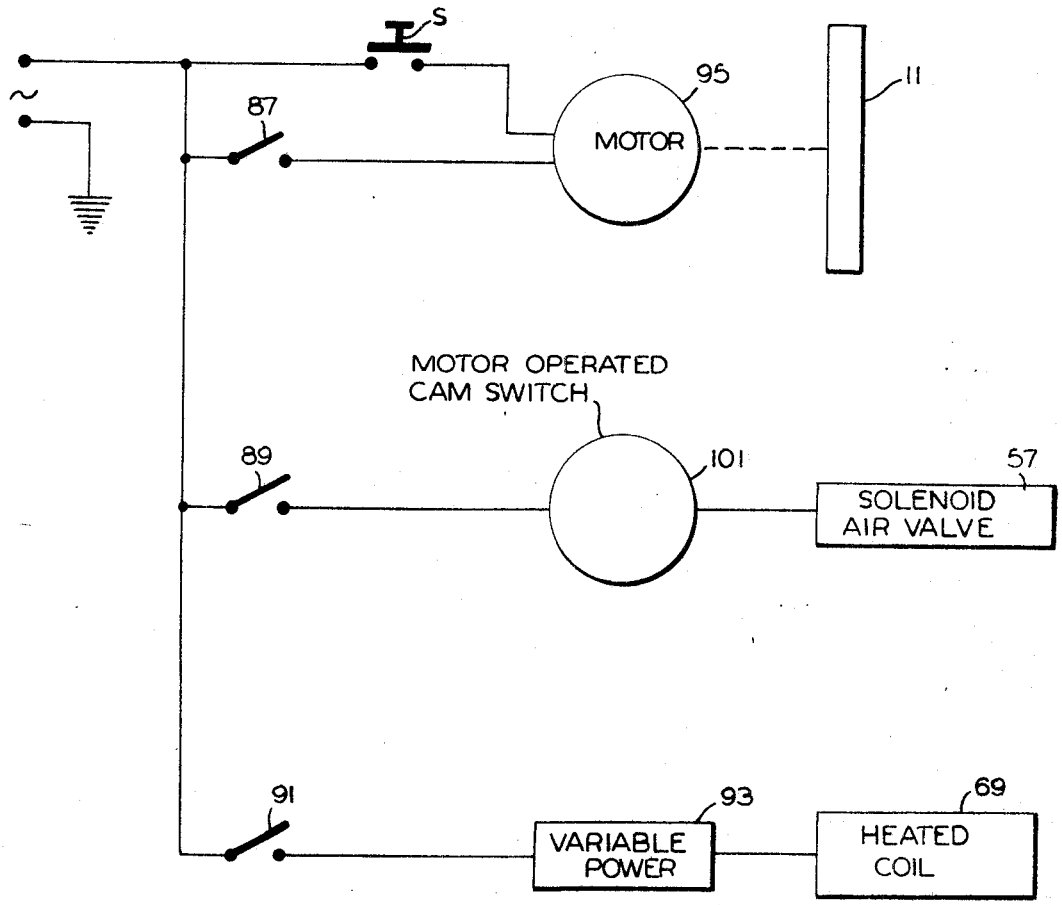

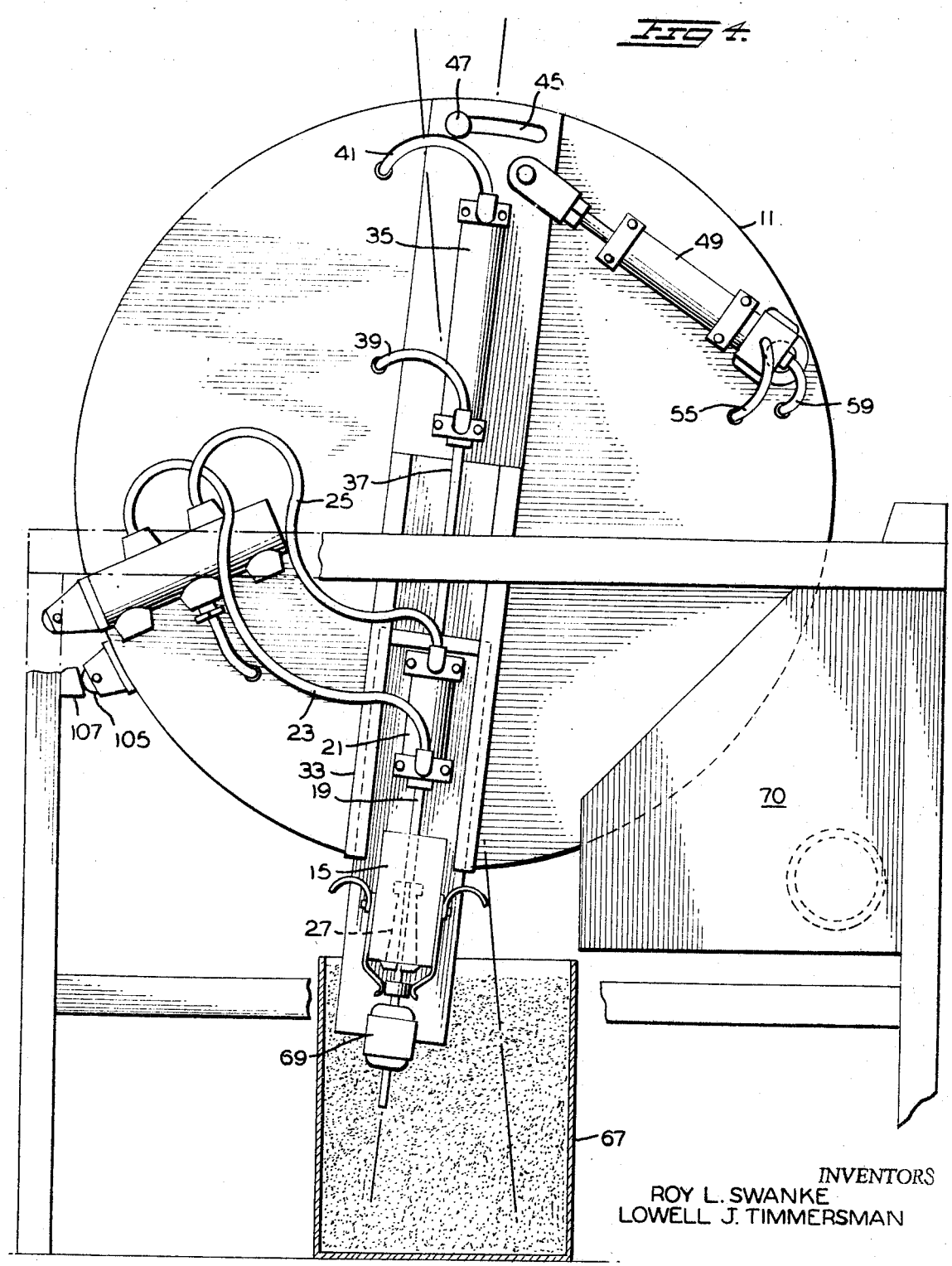

United States Patent Office 3,512,500
Patented May 19, 1970

3,512,500
APPARATUS FOR ENCAPSULATING ELECTRIC COIL STRUCTURES
Roy L. Swanke, Newington, and Lowell J. Timmersman, Winsted, Conn., assignors to Dynamics Corporation of America, New York, N.Y., a corporation of New York
Filed June 30, 1966, Ser. No. 561,905
Int. Cl. B05c 11/14
U.S. Cl. 118—5          5 Claims

ABSTRACT OF THE DISCLOSURE

Apparatus for encapsulating electric coil configurations in a thermoplastic material of a powdered form. The wire of the coil is heated and subsequently immersed in the thermoplastic material for a predetermined time. The apparatus is mounted on a rotatable base with an extensible work gripper so that the operation may be automatically programmed.

---

Figure 1:
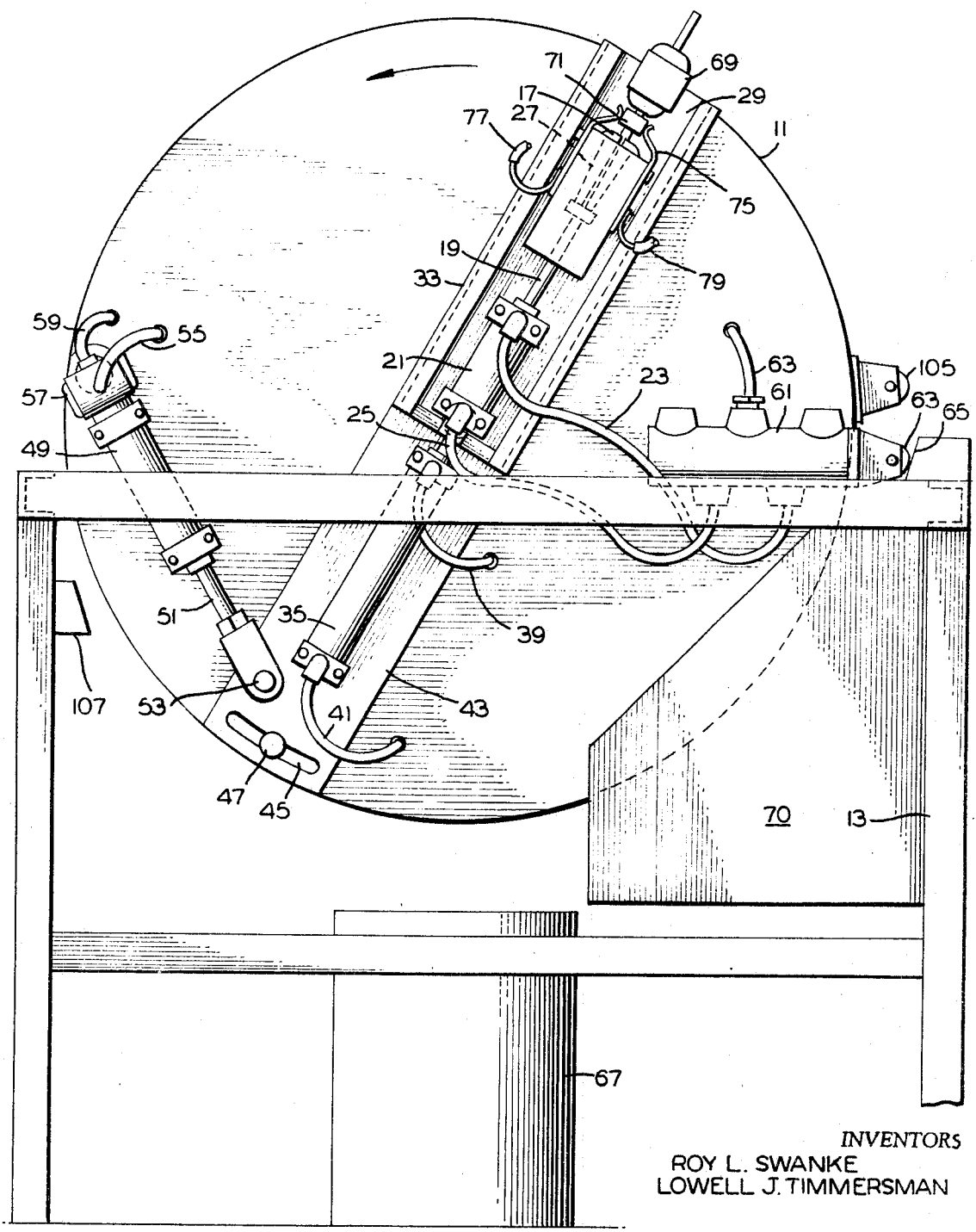

This invention relates generally to the encapsulation of electric devices and more specifically to the ensapsulation of wire wound in a coil configuration for electrical uses.

At the present time, a number of different processes have been devised for providing such encapsulation. To our knowledge, all of these processes have involved the use of a liquid thermosetting type of compound which may be sprayed or brushed on the article, or the article may be dipped in the liquid with subsequent heating of the article to set the compound. Not only is this procedure time consuming, but it is also a process which is very untidy and requires constant cleaning and policing of the work area.

An additional problem which has been present in the past is that a fairly skilled operator has been required to properly encapsulate each device, and the operator is required to attend the process and apparatus constantly in order to assure the best results.

The present invention provides apparatus for encapsulating electric coil configurations wherein a thermoplastic material is used in a powdered form and the apparatus is automatic through a continued cycle so that the device need not be attended constantly. Since a thermoplastic material will only cling to a heated object, the process is much cleaner and easier to control than when the liquid is used.

Basically, the invention provides associated apparatus for encapsulating a wire wound in a coil configuration by automatically providing means for heating the wire by passing electrical current therethrough for a predetermined period of time, means for immersing the heated coil into a powdered thermoplastic material whereby the material will melt about the wire configuration, means for removing the wire configuration from the thermoplastic material and allowing it to cool whereby the encapsulation will be complete. The apparatus is automatically programmed to provide the above steps once the cycle has begun so that there is no need to attend the coating procedure while it is taking place.

The invention will be more clearly understood from the following description when taken together with the drawings wherein:

FIG. 1 is an elevational view of a preferred embodiment of the device at the start of the operative cycle;
FIG. 2 is a plan view of FIG. 1;
FIG. 3 is a schematic showing of the electrical connection for the device of FIG. 1; and
FIG. 4 is an elevational view showing the device when it is in the middle of the operating cycle.

Turning now more specifically to the drawings, there is shown a base such as a wheel 11 mounted for rotation on a frame structure 13. A housing 15 is contained between rails 16 on a slidable plate 29. One end of the housing 15 terminates in a collet 17. A shaft 19 extends outwardly from the opposite end of the housing 15 and is operatively connected to an air cylinder 21. The air cylinder 21 is operated by means of air under pressure from hoses 23 and 25.

Within the housing 15 are located camming surfaces 27 which are basically part of the collet 17 so that, when shaft 19 is moved into the housing 15, it bears against the camming surfaces 27 and causes the collet to close and grasp any item that is inserted therein.

Plate 43 is pivotally mounted centrally on wheel 11 and carries not only plate 29 between the rails 16, but also an air cylinder 35 which in turn is coupled to the plate 29 by means of shaft 37. Air for operation of cylinder 35 is provided by means of air hoses 39 and 41. When shaft 37 is extended outwardly by means of air pressure from the cylinder 35, it will extend the housing 15 outwardly of the wheel together with any item in the collet 17.

Plate 43 additionally has an arcuate slot 45 near the outer end thereof and a pin 47 extending through the slot 45. This configuration permits the plate to be oscillated in a small arc back and forth as indicated by the arrows.

In order to provide a means for oscillating plate 43, a four-way solenoid air cylinder 49 is coupled to the plate 43 by means of a rod 51 hinged about pivot point 53. Current is supplied to solenoid 57 by means of electrical lead 55 and the input air which passes through the solenoid valve 57 is supplied by means of air hose 59.

A two-way cam valve having an air input hose 63 with outputs to the air hoses 23 and 25 is shifted in its position by means of cam surface 65 bearing against the small wheel 63 as the main wheel 11 is rotated. When the wheel 63 bears against the cam surface 65 the air supply is shifted to air hose 25 and the shaft 19 is retracted from the housing 15, thus opening the collet. At all other times the air pressure from the valve 61 is supplied to air hose 23 which drives the shaft inwardly into the housing so as to close collet 17. In the position as shown in FIG. 1, the collet is open to allow insertion of an electric coil such as a rotor assembly 69. The brushes 71 of rotor assembly 69 are contacted by the spring contact members 73 and 75 which in turn are electrically connected to leads 77 and 79, respectively. Therefore, when a current is passed through the leads and into the commutator, for a predetermined period of time depending upon the intensity of the current, the coil structure will heat up sufficiently to be above the melting temperature of the thermoplastic material which is used.

A cleaning station is formed by box 70 which, as can be seen more clearly in FIG. 2, has a hose 111 connected to a large type vacuum suction device 109 to pull air therethrough.

Also in FIG. 2, there is shown a series of cams 81, 83 and 85 mounted on shaft 99 which is connected to and rotates the wheel 11. These cams are associated with cam actuated electrical switches 87, 89 and 91, respectively.

Switch 87, when actuated by the cam 81, supplies the power to motor 95 which is a variable speed motor adjusted by the handle member 96. This motor drives a connecting means such as chain 98 by means of shaft 97. The chain drives the shaft 99 so as to turn wheel 11.

Switch 91 activates a variable powerstat 93 having a power output which is controllable by means such as a knob 94. As will be seen from the circuit diagram of FIG. 3, the variable powerstat output is delivered to the spring contact members 77 and 79 through slip rings 102 to provide current to the coil of the rotor 69 so as to raise the temperature thereof.

Switch 89 when activated provides power to a motor controlled unit 101 through the slip rings 102. Unit 101 provides the power to the solenoid 57 of valve 49. This unit is a commercially available device which employs a rotating cam so as to interrupt the power supply to the solenoid at a predetermined regular interval.

The slip rings 102 are used to supply the power for heating the coils and the power for actuating the solenoid in order to avoid any entanglement of connections during rotation of the wheel member 11. Similarly, the main supply air hose 104 passes through shaft 99 and includes an airtight rotatable connection (not shown) so as to eliminate entanglement of the various hoses on the wheel A two-way cam valve 103 is mounted on the opposite side of the wheel from the two-way cam valve 61 and is provided to supply the air to the leads 39 and 41 of the air cylinder 35. In the position shown in FIG. 1, the air supply is delivered to the hose 39 and maintains the cylinder in a position such that the shaft 37 is drawn within the cylinder 35. However, when the small wheel 105 of the cam valve 103 reaches the point wherein it strikes the camming surface 107, the air pressure is shifted to hose 41 and drives the shaft 37 outwardly from the cylinder 35, thus forcing the entire upper unit including the housing 15 and the rotor 69 outwardly from the circumference of the wheel.

One cycle of operation may be observed from the two views illustrated by FIGS. 1 and 4. In FIG. 1 the cam surface 65 bearing against wheel 63 has caused the collet 17 to open so as to accept the shaft of the rotor member 69. As the wheel 11 turns counterclockwise, small wheel 63 will pass beyond the camming surface 65 and the pressure to the cylinder 21 will be reversed and the collet will firmly grasp the rotor and hold it in place.

Substantially simultaneously with the grasping of the rotor by the collet, the cam 85 (FIG. 2) closes the circuit by means of switch 91 to provide power to the rotor winding through the spring contact members 73 and 75. As the wheel continues to rotate relatively slowly, the current passing through the rotor winding heats the wires. It should be noted that the purpose of having a variable powerstat and a variable motor drive is to provide means for accepting all types and sizes of electrical coils. The criterion being that the coils should be heated to the desired temperature when the wheel 11 has rotated approximately 180 degrees.

When the wheel 11 has rotated approximately one-half cycle, the small wheel 105 on the two-way cam valve 103 will strike the bearing surface 107 as shown in FIG. 4. This camming operation shifts the air pressure from valve 103 to hose 41, thus causing the shaft 37 to be forced outwardly of cylinder 35. Since the shaft is connected to slidable plate 29, it forces the housing 15 and the rotor 69 radially outwardly from the wheel 11. As can be seen from FIG. 4, the arrangement is such that this outward extension forces the rotor 69 into the container 67 having a thermoplastic material therein.

In order to assure a complete contact of the powdered thermoplastic material while the rotor is immersed therein, the cylinder 49 is activated by means of the solenoid valve 57. The rapidly varying current supplied from the motor operated camming means 101 causes the shaft 51 to rapidly extend outwardly from and be drawn inwardly to the cylinder 49. Since the shaft is hinged at pin 53, this will cause the entire base member 43 to oscillate about pin 47 in the arcuate groove 45. In effect, this provides a shaking motion so that the rotor is thoroughly contacted by the powdered material. This, in turn, assures that all parts of the rotor will be covered with the thermoplastic material as it melts due to the heat which has been built up in the rotor structure.

As cam 107 is bypassed by the wheel 105, the air pressure is shifted back to hose 39 and the rotor is withdrawn to the position relative to the wheel as is shown in FIG. 1. Continued rotation of the wheel moves the rotor into the cleaning station box 70 wherein air is drawn by means of the vacuum 109 and hose 111 so as to remove any remaining powdered material which is not melted on the rotor. If desired, an additional air hose could be provided to create a cleaning blast of air.

Further counterclockwise rotation of the wheel 11, again brings the small wheel 63 into contact with camming surface 65 so as to open collet 17 and allow rotor 69 to be removed.

It should be noted that a starting switch S, shown schematically in FIG. 3, is provided so as to by-pass switch 87. This arrangement allows the operator to start motor 95 at the beginning of the cycle. This is necessary since switch 87 stops motor 95 substantially simultaneously with the opening of collet 17. A slight rotation of shaft 99 will return switch 87 to its closed position.

Any dielectric thermoplastic material may be used having temperature characteristics which allow it to maintain its solid state under normal coil operating conditions, but with a melting point low enough to be compatible with abnormal but non-destructive coil temperatures. One such material is a thermoplastic epoxy resin.

It will now be obvious that individual electrical and pneumatic components could be substituted in the above described apparatus while remaining within the scope of the present invention. Accordingly, the above description and associated drawings are to be considered as descriptive only, and the scope of the invention is not to be limited thereby.

We claim:
1. Apparatus for encapsulating a wire wound in a coil configuration within a thermoplastic material in a container comprising,
   a rotatable base,
   a pivoted plate mounted on said base,
   a slidable plate carried by said pivotal plate, and
   an extensible work gripper mounted on said slide plate for holding said coil,
   said work gripper being extendable so as to place said coil within said container when said rotatable base is in a predetermined position.
2. The apparatus of claim 1 wherein said pivotal plate is oscillated so as to agitate said coil while in said container.
3. The apparatus of claim 1 further comprising,
   means for supplying current through said coil for a predetermined period of time so as to heat the coil to the melting temperature of said thermoplastic material.
4. The apparatus of claim 3 further comprising,
   means for supplying said current to said coil when said coil is placed in said gripper.
5. The apparatus of claim 1 wherein said rotatable base is a substantially flat circular disc.

References Cited
UNITED STATES PATENTS

| | | | |
|---|---|---|---|
| 1,589,711 | 6/1926 | Martinez | 118—425 X |
| 2,245,425 | 6/1941 | Aungst. | |
| 2,442,183 | 5/1948 | Stearns | 118—425 X |
| 2,556,744 | 6/1951 | Walrath | 118—425 X |
| 2,845,044 | 7/1958 | Cohen | 118—57 X |
| 3,105,776 | 10/1963 | Weyhmueller | 118—55 X |
| 3,200,788 | 8/1965 | Tardoskegyi | 118—54 X |
| 3,261,707 | 7/1966 | Korski et al. | 118—425 X |
| 3,278,998 | 10/1966 | Tinguist et al. | 118—56 X |
| 3,145,127 | 8/1964 | Baun. | |

MORRIS KAPLAN, Primary Examiner

U.S. Cl. X.R.

118—6, 56, 620; 134—159